Patented Nov. 11, 1947

2,430,564

UNITED STATES PATENT OFFICE 2,430,564

COMPOSITIONS CONTAINING COPOLYMERS OF VINYL ACETATE WITH DIALKYL ESTERS OF MALEIC ACID AND PROCESS BY WHICH SUCH COPOLYMERS AND COMPOSITIONS ARE PREPARED

Philip L. Gordon, New York, N. Y., assignor to American Waterproofing Corporation, Brooklyn, N. Y., a corporation of New York No Drawing. Application November 30, 1945, Serial No. 632,122

17 Claims. (Cl. 260—32)

This invention relates to coating compositions containing as the principal film-forming or basic ingredients a copolymer of vinyl acetate with a dialkyl ester of maleic acid and to the process by which such copolymers and compositions are prepared.

This application is a continuation-in-part of my applications Serial Nos. 451,404, filing date July 18, 1942, and 463,080, filing date October 23, 1942.

Synthetic resins of the high polymer type theoretically have great possibilities for use as such for a protective coating composition or as the principal film-forming or basic ingredient for varnish or paint compositions. Yet, even though these materials have been known for many years, they have not been widely used for these purposes. Heretofore, industry has been unable to procure a liquid coating composition, containing a plastic and elastic synthetic high polymer resin as the principal film-forming ingredient, which is highly resistant to corrosive media and yet has the consistency or viscosity and solids content which makes it appropriate for easy and economical application to surfaces to be protected or decorated and protected. Generally speaking, coating compositions, having appropriate viscosity for easy and economical application which incorporate synthetic resinous high polymer base materials forming chemically inert films that are elastic and plastic, have either contained too small a percentage of solids to form a truly protective coating or have been too viscous for efficient application.

Attempts have been made to remedy these difficulties by using a strong solvent in order to obtain a higher solids content and appropriate viscosity. Such attempts have not been successful, and any success experienced has been more than offset by the impracticality of applying a multiplicity of coats or recoating a surface which has previously been coated, for the strong solvents swell or dissolve the lower or previously applied coat and produce an irregular and unattractive surface.

It is an object of my invention to provide a protective coating composition of a viscosity or consistency suitable for easy application which will form a chemically inert plastic and elastic film when applied to a surface to be protected and which contains ample solids to form a truly protective coating.

Another object is to provide a coating composition of the type described which does not require the use of added plasticizers.

A further object is to provide a protective coating composition of a consistency and solids content suitable for easy and economical application which contains a rubbery elastic and plastic copolymer of vinyl acetate and a dialkyl ester of maleic acid, as the principal film-forming ingredient, incorporated in a solvent medium which permits the application of a multiplicity of coats without deleteriously swelling or dissolving previous coats.

Still another object is to provide a liquid coating composition of a consistency and solids content suitable for easy and economic application containing as its principal film-forming ingredient a plastic and elastic resinous copolymer of vinyl acetate and a dialkyl ester of maleic acid which on being applied quickly forms a plastic and elastic film highly resistant to corrosive media.

An additional object is to provide a solution of a plastic and elastic synthetic high polymer resin in an inexpensive solvent media in a concentration which provides ample solids content and appropriate viscosity for use as a base for a moderately priced paint or varnish composition.

Other objects, purposes, and advantages of my invention will be apparent from the following more detailed description.

I have found that a liquid protective coating composition having the properties mentioned may be obtained by copolymerizing a dialkyl ester of maleic acid, containing 5 to 10 carbon atoms in the alkyl radical, with 2 to 7 parts by weight of vinyl acetate in the presence of a solvent medium which is compatible with the copolymer but will not dissolve the copolymer when formed and isolated. The viscosity of this composition can be regulated by varying the amount of such solvent used when incorporating the copolymerization reagents, or by adjusting the solvent content after the copolymerization has taken place. Generally speaking, good coatings are procured when the copolymer content of the composition is at least 40 per cent by weight.

Those copolymers containing less than 2 parts and more than 7 parts of vinyl acetate when prepared by my method are not suitable for general use as protective coatings. Those copolymers containing less than 2 parts of vinyl acetate, normally form a permanently tacky film while those containing more than 7 parts of vinyl acetate are usually too brittle. Those copolymers containing more than 7 parts of vinyl acetate, under some conditions, may be rendered suitable as the basic ingredient of coating compositions by the incorporation of plasticizers which make such compositions permanently flexible. Such compositions are more expensive than those which do not require the use of such plasticizers.

While the copolymers of vinyl acetate and the dialkyl esters of maleic acid, say those containing 3 and 4 carbon atoms, in the proportions taught, may be used as protective coating compositions, they are inferior to those obtained when the alkyl group contains 5 to 10 carbon atoms, for they have a tendency to become tacky when subjected to abnormally high temperatures.

I have found also that copolymers of vinyl acetate and other dialkyl esters of maleic acid can be incorporated in the solvent media described herein, when the copolymerization takes place in the presenec of such solvents, in higher percentages than is possible after they have already been polymerized and isolated.

Various compatible solvents which will not dissolve the dried copolymer film of the specified dialkyl esters of maleic acid and vinyl acetate when copolymerized in the proportions disclosed may be used. In general, those solvent materials which are compatible with the highly polymerized vinyl acetate resins, but which will not dissolve such resins, are preferred. Such solvents are known as swelling agents and diluents for these resins and generally have no "lifting" action on high polymer vinyl resin coatings. Among them are certain high boiling aliphatic alcohols, such as amyl alcohol, aromatic hydrocarbons such as xylol, and especially those having a high boiling point, hydrogenated aromatic hydrocarbons such as hydrogenated solvent naphtha and the like. Those hydrocarbon solvents generally designated as high boiling, say those boiling above about 130° C., and especially the aromatic and hydrogenated aromatic hydrocarbons of this type, have been found especially well suited for the purposes of this invention.

In performing the copolymerization in the presence of a solvent medium, it is preferable to use catalysts, although they are not necessary. Suitable catalysts including peroxide catalysts, such as benzoyl peroxide, and especially acetyl benzoyl peroxide may be used.

In the examples, parts are expressed in the conventional manner, namely, parts by weight:

*Example I*

A solution was made consisting of the following ingredients:

| | Parts |
|---|---|
| Vinyl acetate (monomeric) | 35 |
| Diamyl maleate | 5 |
| Acetyl benzoyl peroxide | 0.6 |
| Xylol | 5 |
| Amyl alcohol | 5 |

The solution was boiled in a reflux condenser, and after four hours about 85 per cent of the vinyl acetate and the diamyl maleate had copolymerized.

Upon eliminating the amyl alcohol and the xylol, a colorless, transparent plastic and elastic rubbery resin was obtained. After the elimination of the solvent medium, this resin could not be redissolved therein nor in similar weak solvents.

The resin retained its elastic and plastic properties under all normal atmospheric conditions. Neither excessively high nor excessively low temperatures destroyed the capacity of the resin, when deformed, to slowly but completely retract to its original shape. Upon heating, the resinous material did not melt, but at temperatures of about 200° C. it began to char.

The reaction mass obtained in this example was somewhat too viscous as a base for coating compositions, but it was easily diluted with the solvents mentioned hereinbefore. A composition well adapted for use as a paint or varnish vehicle was obtained by adding a hydrogenated aromatic petroleum solvent naphtha, known as Solvesso No. 3, until the solution carried about 40 per cent of solids.

When the copolymerization was carried out in the presence of xylol alone and the viscosity of the reaction mass adjusted by adding xylol until the solids content was about 40 per cent, an especially economical chemically resistant paint or varnish vehicle was obtained.

In this example, when 7.5 parts of diamyl maleate were used, instead of 5 parts, a more flexible film was obtained. When the amount of diamyl maleate was increased to 25 parts, a product permanently tacky at room temperatures was obtained. I found it was necessary to use at least 2 parts, and preferably at least 3 parts, of vinyl acetate for each part of diamyl maleate to obtain a product that was permanently hard but elastic under conditions normally encountered when used as a base for protective coating compositions. When less than 2 parts of vinyl acetate were used, a material permanently tacky at normal or room temperature was obtained.

*Example II*

An emulsion was made consisting of the following ingredients:

| | Parts |
|---|---|
| Monomeric vinyl acetate | 35 |
| Diamyl maleate | 7.5 |
| Acetyl benzoyl peroxide | 0.6 |
| Wetting agent [1] | 0.4 |
| Water | 15 |

[1] An ester of a sulfonated bicarboxylic acid known as "Aerosol OT."

The emulsion was boiled under a reflux condenser to polymerize the vinyl acetate and the diamyl maleate. As the copolymer formed, it precipitated out of the emulsion. After the copolymerization was completed, the solvents were driven off at 110° C.

The precipitated and dried copolymer obtained had substantially the same properties as the isolated second product obtained in the preceding example wherein 7.5 parts of vinyl acetate were used. It was soluble in ketone solvents for vinyl resins but was not dissolved by amyl alcohol, benzene, toluol, xylol, hydrogenated aromatic solvents or the like.

When the catalyst, acetyl benzoyl peroxide, was replaced with benzoyl peroxide, a somewhat more brittle resin was obtained.

Example III

A solution was made consisting of the following ingredients:

| | Parts |
|---|---|
| Monomeric vinyl acetate | 35 |
| Dioctyl maleate | 7 |
| Xylol | 10 |
| Acetyl benzoyl peroxide | 0.6 |

The solution was refluxed under atmospheric pressure until it became very viscous. Upon the addition of 50 parts by weight of xylol, a solution was formed containing approximately 40 per cent of nonvolatile or solid matter which had a viscosity of approximately one poise. This solution, when brushed upon a wood or metal surface, dried to a hard glossy, flexible film in less than 2 hours. The dried film, when recoated with the same solution, formed a smooth film with no apparent lifting of the undercoat. The coating is highly resistant to the corrosive action of most chemicals.

Where an opaque coating is desired, various pigments or other colors may be incorporated in the composition.

If the reaction mass is allowed to stand or is further heated, it will dry into a hard, plastic, and elastic resin which is insoluble in the xylol or similar weak solvent. This resin may be solubilized, however, in strong solvents for vinyl resins such as the various low molecular alkyl ketones.

Example IV

A solution was made consisting of the following ingredients:

| | Parts |
|---|---|
| Monomeric vinyl acetate | 35 |
| Didecyl maleate | 7 |
| Xylol | 10 |
| Acetyl benzoyl peroxide | 0.6 |

The mixture was refluxed until viscous. Additional xylol was added until the solids content equaled to about 40 per cent of the total composition. The resulting composition had a viscosity appropriate for easy application to metal, wood, or other surfaces. The solution was homogeneous but slightly cloudy. When brushed upon the surface to be coated, a hard, flexible film was formed that dried with a semigloss.

Example V

A solution was made consisting of the following ingredients:

| | Parts |
|---|---|
| Monomeric vinyl acetate | 35 |
| Dihexyl maleate | 7 |
| Solvesso No. 1 [1] | 10 |
| Acetyl benzoyl peroxide | 0.6 |

[1] A hydrogenated naphtha with a boiling range of 94–139° C.

Upon treating this solution as in Example III, substantially the same results were procured except the resulting film was not quite so hard or tough.

If the 7 parts of dihexyl maleate are replaced with 25 parts, the other ingredients remaining the same, and the mixture refluxed until viscous, this viscous solution could be used as such or slightly diluted by an addition of more of the solvent for application of a film by knife coating. The formed film is clear and sticky and possesses good adhesive properties.

Corresponding esters of other dibasic acids, such as, fumaric acid, citraconic, and itaconic acid, have been used to replace the esters of maleic acid. The resulting copolymers have proven inferior to those of the present invention, for they are generally too brittle and relatively insoluble in the cheaper organic solvents.

It will be understood that the embodiments of my invention described and illustrated herein are only representative of the principles of my invention and the agents and reactants used therein. Various modifications in the illustrative embodiments of my invention can be made without departing from the spirit of the invention or its scope which is defined in the appended claims.

I claim:

1. A colorless, transparent, hard, rubbery plastic and elastic resinous material consisting of the copolymerization product of 1 part of a dialkyl ester of maleic acid, containing 5 to 10 carbon atoms in the alkyl radical, with 2 to 7 parts by weight of vinyl acetate.

2. A liquid composition adapted for use as a base for paint and varnish compositions, comprising the copolymer of 1 part of a dialkyl ester of maleic acid, containing from 5 to 10 carbon atoms in the alkyl radical, with 2 to 7 parts by weight of vinyl acetate incorporated in a hydrocarbon solvent boiling above about 130° C.

3. A liquid composition adapted for use as a base for paint and varnish compositions, comprising the copolymer of 1 part of a dialkyl ester of maleic acid, containing from 5 to 10 carbon atoms in the alkyl radical, with 2 to 7 parts by weight of vinyl acetate incorporated in xylol.

4. A rubbery plastic and elastic material consisting of the copolymerization product of 1 part of a dioctyl ester of maleic acid with 2 to 7 parts by weight of vinyl acetate.

5. A rubbery plastic and elastic resinous material consisting of the copolymerization product of 1 part of the di-(2-ethyl-hexyl) ester of maleic acid with 2 to 7 parts by weight of vinyl acetate.

6. A rubbery plastic and elastic material consisting of the copolymerization product of 1 part of the dihexyl ester of maleic acid with 2 to 7 parts by weight of vinyl acetate.

7. A process of producing a plastic and elastic, rubbery, hard resin which comprises incorporating a mixture consisting of 1 part of a dialkyl ester of maleic acid containing from 5 to 10 carbon atoms in the alkyl radical and from 2 to 7 parts by weight of vinyl acetate in an inert liquid medium and heating said reactants in said liquid medium.

8. The process of producing a protective coating vehicle carrying in solution a copolymer resin adapted to become substantially insoluble after the evaporation of the solvent which consists in heating together 1 part of a dialkyl ester of maleic acid containing from 5 to 10 carbon atoms in the alkyl radical and 2 to 7 parts of vinyl acetate in an inert solvent until the copolymer forms.

9. A liquid composition comprising a resinous material consisting of the copolymer of 1 part of a dialkyl ester of maleic acid containing 5 to 10 carbon atoms in the alkyl radical with 2 to 7 parts by weight of vinyl acetate dissolved in an inert solvent medium, said composition upon being applied to a surface and after the evaporation of the solvent forming a tough, rubbery, hard film which is substantially insoluble in the original solvent.

10. A liquid composition comprising the copolymer of 1 part of a dialkyl ester of maleic acid containing from 5 to 10 carbon atoms in the alkyl radical with 2 to 7 parts by weight of vinyl acetate dissolve in an inert solvent, the resulting solution carrying at least 40 per cent of solids, and said composition being capable of depositing upon evaporation of the solvent a tough, rubbery, hard flexible film which is substantially insoluble in the original solvent.

11. The process of producing in solution a copolymer resin adapted to become substantially insoluble after evaporation of the solvent and serve as paint vehicle or varnish, which consists in heating together diamyl maleate with seven times its weight of vinyl acetate in solution in xylol and amyl alcohol until the solution carries a large amount of the polymer.

12. A liquid composition comprising a resinous material consisting of the copolymer of 1 part of diamyl maleate with 2 to 7 parts by weight of vinyl acetate dissolved in an inert solvent medium, said composition upon being applied to a surface and after the evaporation of the solvent forming a tough, rubbery, flexible, hard film which is substantially insoluble in the original solvent.

13. A liquid composition comprising the copolymer of 1 part of diamyl maleate with 7 parts by weight of vinyl acetate dissolved in an inert solvent, the resulting solution carrying at least 40 per cent of solids, and said composition being capable of depositing, upon evaporation of the solvent, a tough, rubbery, hard, flexible film, which is substantially insoluble in the original solvent.

14. A process of producing a solution of a copolymer resin adapted to become substantially insoluble after the evaporation of the solvent which consists in forming a copolymer by heating diamyl maleate with 2 to 7 times its weight of vinyl acetate in an inert solvent for said compounds until the solution carries a large amount of said copolymer and thereafter thinning said solution with said solvent.

15. The process of producing a paint vehicle carrying in solution a copolymer resin adapted to become substantially insoluble after the evaporation of the solvent which consists in heating together 1 part of diamyl maleate and 7 times its weight of vinyl acetate in an inert solvent until the copolymer forms.

16. A process of producing a plastic and elastic, rubbery, hard resin which comprises incorporating a mixture consisting of 1 part of diamyl maleate and from 2 to 7 parts by weight of vinyl acetate in an inert liquid medium and heating said reactants in said liquid medium.

17. A substantially colorless, transparent, hard, rubbery resin consisting of the copolymer of 1 part of diamyl maleate with 2 to 7 parts by weight of vinyl acetate.

PHILIP L. GORDON.

REFERENCES CITED

The following references are of record in the file of this patent:

UNITED STATES PATENTS

| Number | Name | Date |
|---|---|---|
| 2,047,398 | Voss | July 14, 1936 |
| 2,376,653 | Boyer | May 22, 1945 |